United States Patent
Lim et al.

(10) Patent No.: US 12,082,282 B2
(45) Date of Patent: Sep. 3, 2024

(54) TECHNIQUES IN SECONDARY CELL GROUP FAILURE MEASUREMENT REPORT

(71) Applicant: Apple Inc., Cupertino, CA (US)

(72) Inventors: Seau S. Lim, Swindon (GB); Candy Yiu, Portland, OR (US); Youn Hyoung Heo, San Jose, CA (US)

(73) Assignee: Apple Inc., Cupertino, CA (US)

( * ) Notice: Subject to any disclaimer, the term of this patent is extended or adjusted under 35 U.S.C. 154(b) by 573 days.

(21) Appl. No.: 17/279,267

(22) PCT Filed: Sep. 24, 2019

(86) PCT No.: PCT/US2019/052687
§ 371 (c)(1),
(2) Date: Mar. 24, 2021

(87) PCT Pub. No.: WO2020/068821
PCT Pub. Date: Apr. 2, 2020

(65) Prior Publication Data
US 2021/0368572 A1    Nov. 25, 2021

Related U.S. Application Data

(60) Provisional application No. 62/736,926, filed on Sep. 26, 2018.

(51) Int. Cl.
*H04W 76/16* (2018.01)
*H04L 27/26* (2006.01)
(Continued)

(52) U.S. Cl.
CPC ....... *H04W 76/16* (2018.02); *H04L 27/26025* (2021.01); *H04W 24/10* (2013.01); *H04W 56/001* (2013.01)

(58) Field of Classification Search
None
See application file for complete search history.

(56) References Cited

U.S. PATENT DOCUMENTS

| 2013/0229971 A1 | 9/2013 | Siomina et al. |
| 2016/0192249 A1 | 6/2016 | Wu |

(Continued)

FOREIGN PATENT DOCUMENTS

| CN | 107318125 A | 11/2017 |
| CN | 108464045 A | 8/2018 |
| JP | 2011139330 A | 7/2011 |

OTHER PUBLICATIONS

Ericsson, Measurement in case of S-RLF, R2-1706633, 3GPP TSG RAN WG2 adhoc_2017_06_NR, Jun. 16, 2017.

(Continued)

*Primary Examiner* — Saad Khawar
(74) *Attorney, Agent, or Firm* — Sterne, Kessler, Goldstein & Fox P.L.L.C.

(57) ABSTRACT

Embodiments of the present disclosure describe methods, apparatuses, storage media, and systems for adequate failure secondary cell group (SCG) reporting in New Radio (NR) involved networks. Various embodiments describe how to generate a sufficient SCG failure report so that a master node (MN) in the network may acknowledge the corresponding failed reference signal including its frequency and subcarrier spacing. In accordance, the MN may configure the UE and network communication effectively. Other embodiments may be described and claimed.

19 Claims, 7 Drawing Sheets

(51) Int. Cl.
*H04W 24/10* (2009.01)
*H04W 56/00* (2009.01)

(56) References Cited

U.S. PATENT DOCUMENTS

| | | |
|---|---|---|
| 2017/0055166 A1 | 2/2017 | Shi et al. |
| 2017/0325225 A1 | 11/2017 | Dinan |
| 2018/0184362 A1 | 6/2018 | Babaei et al. |
| 2018/0270682 A1 | 9/2018 | Zacharias et al. |
| 2018/0270713 A1 | 9/2018 | Park et al. |
| 2018/0287682 A1* | 10/2018 | Kwak ............ H04L 5/0057 |
| 2019/0007248 A1 | 1/2019 | Takeda et al. |
| 2019/0253908 A1* | 8/2019 | Fan ............ H04W 24/08 |

OTHER PUBLICATIONS

3GPP, 3rd Generation Partnership Project; Technical Specification Group Radio Access Network; NR; Radio Resource Control (RRC) protocol specification (Release 15), 3GPP TS 38.331 V15.2.1, Jun. 21, 2018, pp. 51-57, 127-130.

International Search Report and Written Opinion of the International Searching Authority directed to related International Patent Application No. PCT/US2019/052687, mailed Jan. 15, 2020; 8 pages.

Ericsson (Rapporteur), 'Introduction of SA', R2-1813492, 3GPP TSG-WG2, Meeting #103, Gothenburg, Sweden, Sep. 5, 2018; See pp. 90, 224-225.

3GPP TS 38.331 V15.2.1, '3GPP; TSGRAN; NR; Radio Resource Control (RRC) protocol specification (Release 15)', Jun. 21, 2018; See pp. 56-57, 129-130.

3GPP TS 38.331 V15.2.0, 3rd Generation Partnership Project; Technical Specification Group Radio Access Network; NR; Radio Resource Control (RRC) protocol specification (Release 15), Jun. 2018; 304 pages.

Second Office Action and Search Report directed to related Chinese Application No. 201980062349.9, with English-language machine translation attached, mailed May 16, 2024; 10 pages.

ETSI TS 138 508-1, User Equipment (UE) conformance specification; Part 1: Common test environment, 3GPP TS 38.508-1 version 15.1.0 Release 15; Oct. 2018; 266 pages.

\* cited by examiner

TECHNIQUES IN SECONDARY CELL GROUP FAILURE MEASUREMENT REPORT

CROSS REFERENCE TO RELATED APPLICATION

The present application is a National Stage entry from PCT/US2019/052687 filed on Sep. 24, 2019, entitled "Techniques in Secondary Cell Group Failure Measurement Report," which claims priority to U.S. Provisional Patent Application No. 62/736,926, filed Sep. 26, 2018, entitled "Encoding of Secondary Cell Group Failure Measurement Report," all of which are hereby incorporated by reference in their entireties.

FIELD

Embodiments of the present invention relate generally to the technical field of wireless communications.

BACKGROUND

The background description generally presents the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

Various Fifth Generation (5G) New Radio (NR) involved communications and/or networks have been developed in broad frequency ranges, such as sub-6 GHz and millimeter wave (mmWave). In accordance, more than one subcarrier spacing (SCS) have been adopted in NR involved communications. Existing measurement report from a user equipment (UE), especially failure measurement report, may not provide sufficient information to identify failed measurement object (MO) in terms of frequency, SCS, etc. Thus, a network may not be able to identify the MO based on the existing failure measurement report. New solutions are needed in this regard.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
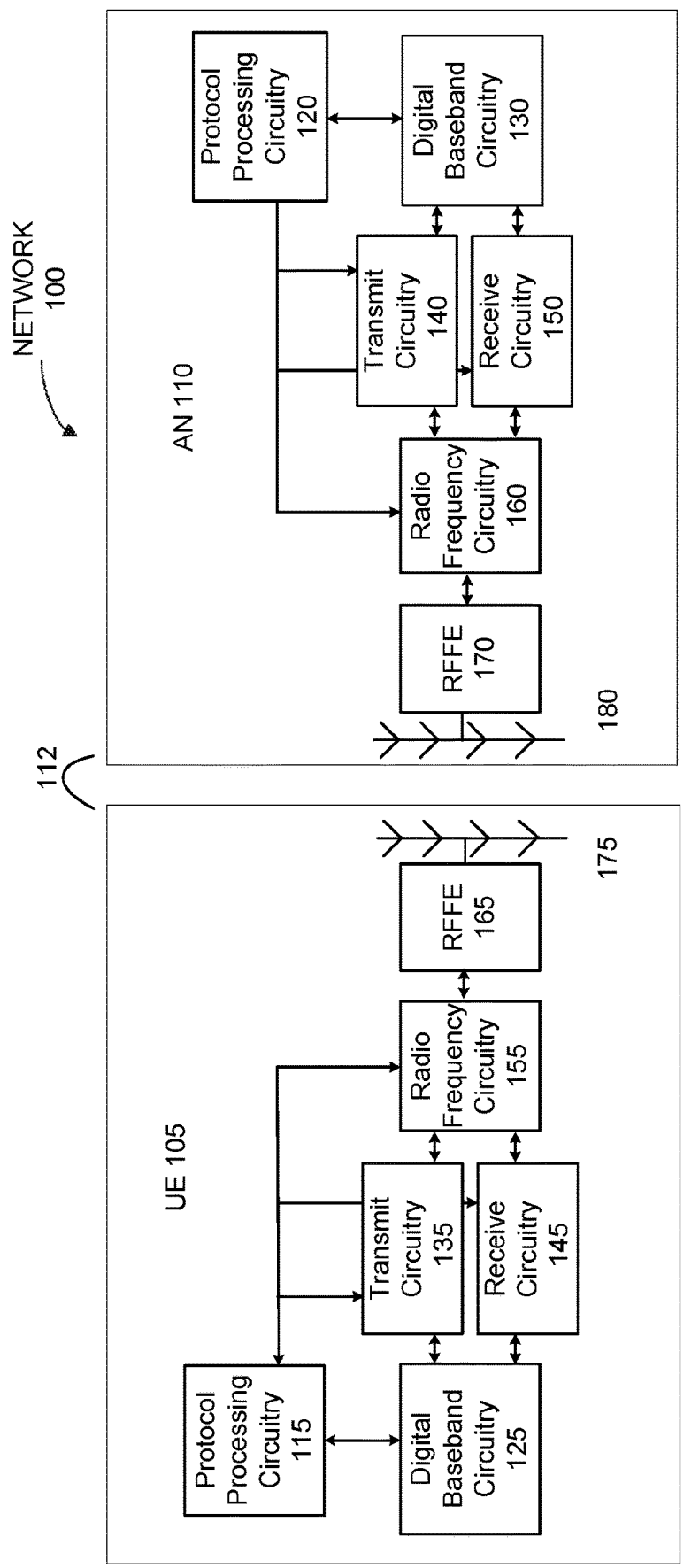
FIG. 1 schematically illustrates an example of a network comprising a user equipment (UE) and an access node (AN) in a wireless network, in accordance with various embodiments.

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A or B" and "A and/or B" mean (A), (B), or (A and B). For the purposes of the present disclosure, the phrases "A, B, or C" and "A, B, and/or C" mean (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include any combination of integrated circuits (for example, a field-programmable gate array (FPGA), an application specific integrated circuit (ASIC), etc.), discrete circuits, combinational logic circuits, system on a chip (SOC), system in a package (SiP), that provides the described functionality. In some embodiments, the circuitry may execute one or more software or firmware modules to provide the described functions. In some embodiments, circuitry may include logic, at least partially operable in hardware.

There are various bands below 6 GHz in 4G LTE networks. In NR, frequency range 1 (FR1) overlaps and extends 4G LTE frequencies, including various bands from 450 MHz to 6,000 MHz, which is commonly referred to as NR sub-6 GHz. NR further includes a frequency range 2 (FR2) covering from 24,250 MHz to 52,600 MHz, which is commonly referred to as mmWave, even though the millimeter wave frequency may start at 30 GHz strictly speaking. Herein, the pairs of FR1/FR2 and sub-6 GHz (below 6 GHz)/mmWave are used interchangeably.

Multi-Radio Access Technology (RAT) Dual Connectivity (MR-DC) may involve a multiple reception (Rx)/transmission (Tx) UE that may be configured to utilize radio resources provided by two distinct schedulers in two different nodes connected via non-ideal backhaul, one providing Evolved Universal Terrestrial Radio Access (E-UTRA) access and the other one providing NR access. One scheduler is located in a Master Node (MN) and the other in the Secondary Node (SN). The MN and SN are connected via a network interface and at least the MN is connected to the core network.

MR-DC may include, but is not limited to, E-UTRA-NR Dual Connectivity (EN-DC), NG-RAN-E-UTRA-NR Dual Connectivity (NGEN-DC), and NR-E-UTRA Dual Connectivity (NE-DC). In an EN-DC network or communication, a UE may be connected to one evolved NodeB (eNB) or ng-eNB that acts as an MN and one next generation NodeB (gNB) that acts as an SN. An ng-eNB may be an enhanced eNodeB that connects to the 5G Core network via the next generation (NG) interfaces but still uses LTE air interfaces to communicate with a 5G UE. So, both the basic gNB and ng-eNB use the new NG interfaces toward the 5G Core but use different radio interfaces towards the UE. Note that "eNB" may be used to indicate an eNB and/or ng-eNB, in some embodiments herein. The eNB or ng-eNB is connected to an evolved packet core (EPC) and the gNB is connected to the eNB. The gNB may be a node that provides new radio (NR) user-plane and control-plane protocol terminations towards the UE, and acts as the SN in EN-DC. In an EN-DC network or communication, by contrast, a UE may be connected to one gNB that acts as an MN and one eNB or ng-eNB that acts as an SN. The gNB is connected to 5G Core (5GC) and the eNB or ng-eNB is connected to the gNB via the Xn interface. In some embodiments, an NR standalone (SA) network may include an NR-NR dual connectivity, in which a gNB is connected to a 5GC and no eNB (or other LTE node) is involved in the NR-NR DC communications.

In EN-DC, NR-NR DC, and/or similar networks that involve an MN and SN, a UE may perform cell and/or beam measurements with respect to one or more cells of an SCG. If the UE determines one or more of the measurement(s) fail based on certain criteria, the UE may provide an SCG failure report to the MN. An existing SCG failure report may not include SCS information of the reference signal that is measured by the UE. However, there are several SCSs available due to NR numerology. Thus, the reference signal measurement may fail with one or more certain SCSs with a particular frequency of the reference signal, but not all of them. Without identifying the SCS, it may cause ambiguity for the MN so that the MN may not determine or derive sufficient information regarding the failed cell level and/or beam level reference signal measurement, based on the existing SCG failure report. This may adversely affect the network in configuring the UE not to access via those cells or beams, or avoiding the access via those cells or beams. It may also adversely affect the network in configuring the UE to access via those cells or beams regarding the best cell level and/or beam level reference signal measurements. Further details are discussed infra with respect to FIG. 4.

Embodiments described herein may include, for example, apparatuses, methods, and storage media for generating an SCG failure report with sufficient information of the reference signal in an NR involved network, so that the MN or SN may be able to identify failed cell/beam level reference signal(s) and determine corresponding operation(s) to or for the SCG. Note that the MN or SN may identify the best cell/beam level reference signal instead of the failed ones, so that the MN or SN may determine corresponding operation(s) accordingly. The reference signal measurements herein may include, but are not limited to, cell level and beam level measurements with respect to a cell The implementation may reduce or avoid ambiguities in recognizing the failed reference signal measurement(s) for the MN and/or network, so that the network resources may be utilized more efficiently.

FIG. 1 schematically illustrates an example wireless network 100 (hereinafter "network 100") in accordance with various embodiments herein. The network 100 may include a UE 105 in wireless communication with an AN 110. In some embodiments, the network 100 may be a NR SA network. The UE 105 may be configured to connect, for example, to be communicatively coupled, with the AN 110. In this example, the connection 112 is illustrated as an air interface to enable communicative coupling, and can be consistent with cellular communications protocols such as a 5G NR protocol operating at mmWave and sub-6 GHz, a Global System for Mobile Communications (GSM) protocol, a code-division multiple access (CDMA) network protocol, a Push-to-Talk (PTT) protocol, and the like.

The UE 105 is illustrated as a smartphone (for example, a handheld touchscreen mobile computing device connectable to one or more cellular networks), but may also comprise any mobile or non-mobile computing devices, such as a Personal Data Assistant (PDA), pager, laptop computer, desktop computer, wireless handset, customer premises equipment (CPE), fixed wireless access (FWA) device, vehicle mounted UE or any computing device including a wireless communications interface. In some embodiments, the UE 105 can comprise an Internet of Things (IoT) UE, which can comprise a network access layer designed for low-power IoT applications utilizing short-lived UE connections. An IoT UE can utilize technologies such as narrowband IoT (NB-IoT), machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An NB-IoT/MTC network describes interconnecting NB-IoT/MTC UEs, which may include uniquely identifiable embedded computing devices (within the Internet infrastructure), with short-lived connections. The NB-IoT/MTC UEs may execute background applications (for example, keep-alive message, status updates, location related services, etc.).

The AN 110 can enable or terminate the connection 112. The AN 110 can be referred to as a base station (BS), NodeB, evolved-NodeB (eNB), Next-Generation NodeB (gNB or ng-gNB), NG-RAN node, cell, serving cell, neighbor cell, and so forth, and can comprise ground stations (for example, terrestrial access points) or satellite stations providing coverage within a geographic area.

The AN 110 can be the first point of contact for the UE 105. In some embodiments, the AN 110 can fulfill various logical functions including, but not limited to, radio network controller (RNC) functions such as radio bearer management, uplink and downlink dynamic radio resource management and data packet scheduling, and mobility management.

In some embodiments, a downlink resource grid can be used for downlink transmissions from the AN 110 to the UE 105, while uplink transmissions can utilize similar techniques. The grid can be a time-frequency grid, called a resource grid or time-frequency resource grid, which is the physical resource in the downlink in each slot. Such a time-frequency plane representation is a common practice for orthogonal frequency division multiplexing (OFDM) systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UE 105. The physical downlink control channel (PDCCH) may carry information about the transport format and resource allocations related to the PDSCH channel, among other things. It may also inform the UE 105 about the transport format, resource allocation, and hybrid automatic repeat request (HARQ) information related to the uplink shared channel. Typically, downlink scheduling (assigning control and shared channel resource blocks to the UE 105 within a cell) may be performed at the AN 110 based on channel quality information fed back from any of the UE 105. The downlink resource assignment information may be sent on the PDCCH used for (for example, assigned to) the UE 105.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition.

Some embodiments may use concepts for resource allocation for control channel information that are an extension of the above-described concepts. For example, some embodiments may utilize an enhanced physical downlink control channel (ePDCCH) that uses PDSCH resources for control information transmission. The ePDCCH may be transmitted using one or more enhanced control channel elements (ECCEs). Similar to the above, each ECCE may correspond to nine sets of four physical resource elements known as enhanced resource element groups (EREGs). An ECCE may have other numbers of EREGs in some situations.

As shown in FIG. 1, the UE 105 may include millimeter wave communication circuitry grouped according to functions. The circuitry shown here is for illustrative purposes and the UE 105 may include other circuitry shown in FIG. 3. The UE 105 may include protocol processing circuitry 115, which may implement one or more of layer operations related to medium access control (MAC), radio link control (RLC), packet data convergence protocol (PDCP), radio resource control (RRC) and non-access stratum (NAS). The protocol processing circuitry 115 may include one or more processing cores (not shown) to execute instructions and one or more memory structures (not shown) to store program and data information.

The UE 105 may further include digital baseband circuitry 125, which may implement physical layer (PHY) functions including one or more of HARQ functions, scrambling and/or descrambling, coding and/or decoding, layer mapping and/or de-mapping, modulation symbol mapping, received symbol and/or bit metric determination, multi-antenna port pre-coding and/or decoding, which may include one or more of space-time, space-frequency or spatial coding, reference signal generation and/or detection, preamble sequence generation and/or decoding, synchronization sequence generation and/or detection, control channel signal blind decoding, and other related functions.

The UE 105 may further include transmit circuitry 135, receive circuitry 145, radio frequency (RF) circuitry 155, and RF front end (RFFE) 165, which may include or connect to one or more antenna panels 175.

In some embodiments, RF circuitry 155 may include multiple parallel RF chains or branches for one or more of transmit or receive functions; each chain or branch may be coupled with one antenna panel 175.

In some embodiments, the protocol processing circuitry 115 may include one or more instances of control circuitry (not shown) to provide control functions for the digital baseband circuitry 125 (or simply, "baseband circuitry 125"), transmit circuitry 135, receive circuitry 145, radio frequency circuitry 155, RFFE 165, and one or more antenna panels 175.

Figure 2:
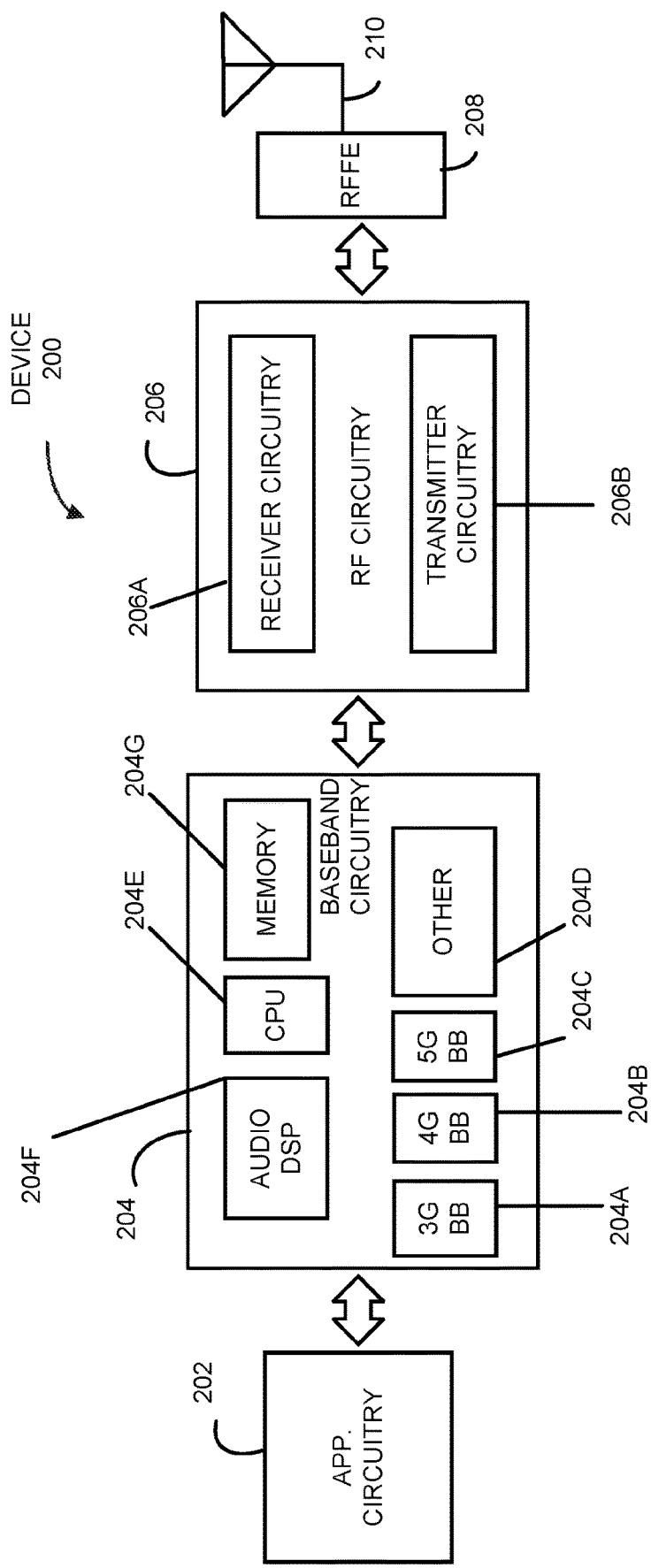
FIG. 2 illustrates example components of a device in accordance with various embodiments.
Figure 6:
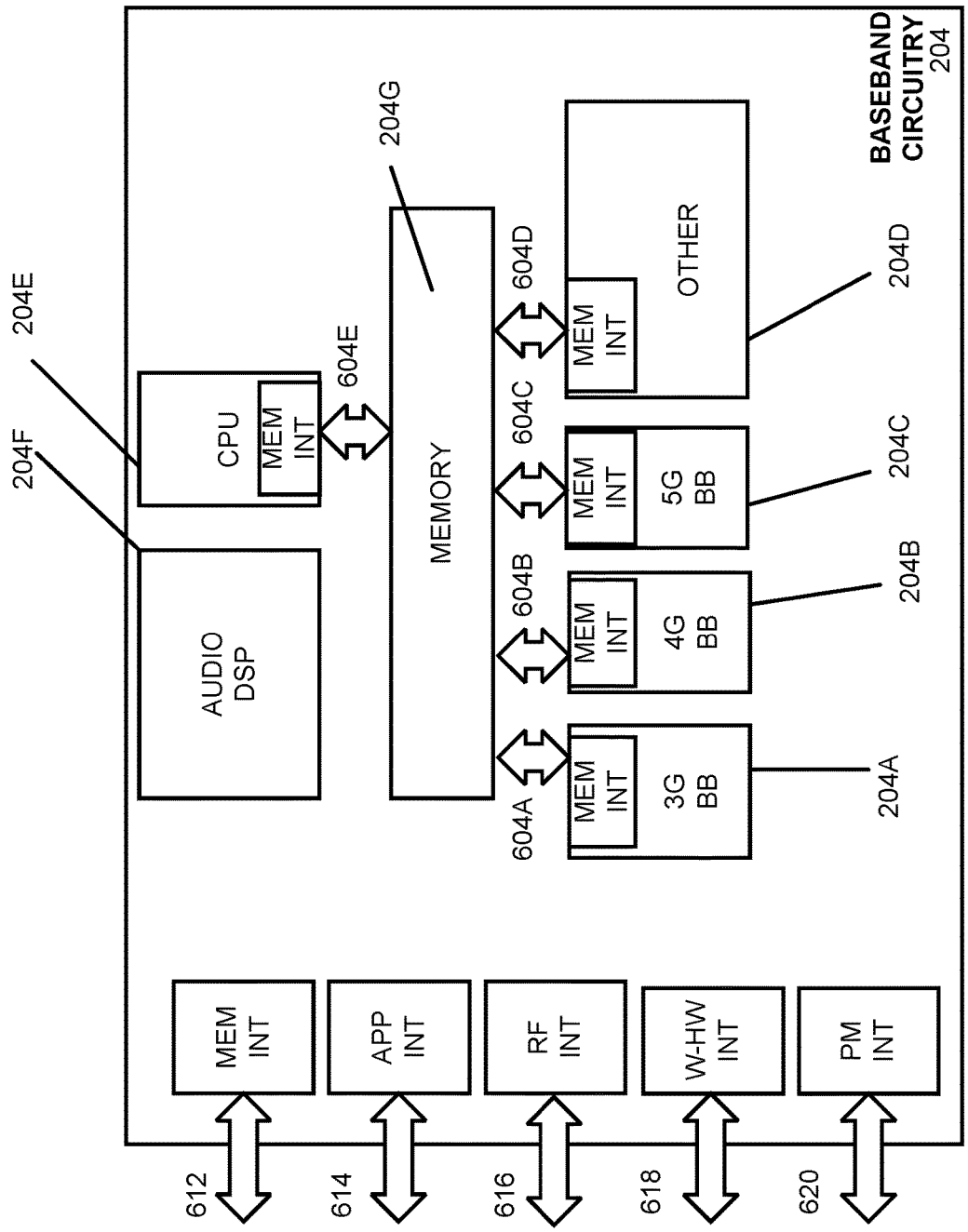
FIG. 6 illustrates example interfaces of baseband circuitry in accordance with some embodiments.

A UE reception may be established by and via the one or more antenna panels 175, RFFE 165, RF circuitry 155, receive circuitry 145, digital baseband circuitry 125, and protocol processing circuitry 115. The one or more antenna panels 175 may receive a transmission from the AN 110 by receive-beamforming signals received by a plurality of antennas/antenna elements of the one or more antenna panels 175. Further details regarding the UE 105 architecture are illustrated in FIGS. 2, 3, and 6. The transmission from the AN 110 may be transmit-beamformed by antennas of the AN 110. In some embodiments, the baseband circuitry 125 may contain both the transmit circuitry 135 and the receive circuitry 145. In other embodiments, the baseband circuitry 125 may be implemented in separate chips or modules, for example, one chip including the transmit circuitry 135 and another chip including the receive circuitry 145.

Similar to the UE 105, the AN 110 may include mmWave/sub-mmWave communication circuitry grouped according to functions. The AN 110 may include protocol processing circuitry 120, digital baseband circuitry 130 (or simply, "baseband circuitry 130"), transmit circuitry 140, receive circuitry 150, RF circuitry 160, RFFE 170, and one or more antenna panels 180.

A cell transmission may be established by and via the protocol processing circuitry 120, digital baseband circuitry 130, transmit circuitry 140, RF circuitry 160, RFFE 170, and one or more antenna panels 180. The one or more antenna panels 180 may transmit a signal by forming a transmit beam. FIG. 3 further illustrates details regarding the RFFE 170 and antenna panel 180.

FIG. 2 illustrates example components of a device 200 in accordance with some embodiments. In contrast to FIG. 1, FIG. 2 illustrates example components of the UE 105 or the AN 110 from a receiving and/or transmitting function point of view, and it may not include all of the components described in FIG. 1. In some embodiments, the device 200 may include application circuitry 202, baseband circuitry 204, RF circuitry 206, RFFE circuitry 208, and a plurality of antennas 210 together at least as shown. The baseband circuitry 204 may be similar to and substantially interchangeable with the baseband circuitry 125 in some embodiments. The plurality of antennas 210 may constitute one or more antenna panels for beamforming. The components of the illustrated device 200 may be included in a UE or an AN. In some embodiments, the device 200 may include fewer elements (for example, a cell may not utilize the application circuitry 202, and instead include a processor/controller to process IP data received from an EPC). In some embodiments, the device 200 may include additional elements such as, for example, a memory/storage, display, camera, sensor, or input/output (I/O) interface.

In other embodiments, the components described below may be included in more than one device (for example, said circuitry may be separately included in more than one device for Cloud-RAN (C-RAN) implementations).

The application circuitry 202 may include one or more application processors. For example, the application circuitry 202 may include circuitry such as, but not limited to, one or more single-core or multi-core processors. The processor(s) may include any combination of general-purpose processors and dedicated processors (for example, graphics processors, application processors, etc.). The processors may be coupled with or may include memory/storage and may be configured to execute instructions stored in the memory/storage to enable various applications or operating systems to run on the device 200. In some embodiments, processors of application circuitry 202 may process IP data packets received from an EPC.

The baseband circuitry 204 may include circuitry such as, but not limited to, one or more single-core or multi-core processors. The baseband circuitry 204 may be similar to and substantially interchangeable with the baseband circuitry 125 and the baseband circuitry 130 in some embodiments. The baseband circuitry 204 may include one or more baseband processors or control logic to process baseband signals received from a receive signal path of the RF circuitry 206 and to generate baseband signals for a transmit signal path of the RF circuitry 206. Baseband circuitry 204 may interface with the application circuitry 202 for generation and processing of the baseband signals and for controlling operations of the RF circuitry 206. For example, in some embodiments, the baseband circuitry 204 may include a third generation (3G) baseband processor 204A, a fourth generation (4G) baseband processor 204B, a fifth generation (5G) baseband processor 204C, or other baseband processor(s) 204D for other existing generations, generations in development or to be developed in the future (for example, second generation (2G), sixth generation (6G), etc.). The baseband circuitry 204 (for example, one or more of baseband processors 204A-D) may handle various radio control functions that enable communication with one or more radio networks via the RF circuitry 206. In other embodiments, some or all of the functionality of baseband processors 204A-D may be included in modules stored in the memory 204G and executed via a central processing unit (CPU) 204E. The radio control functions may include, but are not limited to, signal modulation/demodulation, encoding/decoding, radio frequency shifting, etc. In some embodiments, modulation/demodulation circuitry of the baseband circuitry 204 may include Fast-Fourier Transform (FFT), precoding, or constellation mapping/demapping functionality. In some embodiments, encoding/decoding circuitry of the baseband circuitry 204 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 204 may include one or more audio digital signal processor(s) (DSP) 204F. The audio DSP(s) 204F may include elements for compression/decompression and echo cancellation and may include other suitable processing elements in other embodiments. Components of the baseband circuitry may be suitably combined in a single chip, in a single chipset, or disposed on a same circuit board in some embodiments. In some embodiments, some or all of the constituent components of the baseband circuitry 204 and the application circuitry 202 may be implemented together such as, for example, on a SOC.

In some embodiments, the baseband circuitry 204 may provide for communication compatible with one or more radio technologies. For example, in some embodiments, the baseband circuitry 204 may support communication with an evolved universal terrestrial radio access network (E-UTRAN) or other wireless metropolitan area networks (WMAN), a wireless local area network (WLAN), a wireless personal area network (WPAN). Embodiments in which the baseband circuitry 204 is configured to support radio communications of more than one wireless protocol may be referred to as multi-mode baseband circuitry.

RF circuitry 206 may enable communication with wireless networks using modulated electromagnetic radiation through a non-solid medium. In various embodiments, the RF circuitry 206 may include one or more switches, filters, amplifiers, etc. to facilitate the communication with the wireless network. RF circuitry 206 may include receiver circuitry 206A, which may include circuitry to down-convert RF signals received from the RFFE circuitry 208 and provide baseband signals to the baseband circuitry 204. RF circuitry 206 may also include transmitter circuitry 206B, which may include circuitry to up-convert baseband signals provided by the baseband circuitry 204 and provide RF output signals to the RFFE circuitry 208 for transmission.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry and the baseband circuitry 204 may include a digital baseband interface to communicate with the RF circuitry 206.

In some dual-mode embodiments, a separate radio integrated circuit (IC) circuitry may be provided for processing signals for each spectrum, although the scope of the embodiments is not limited in this respect.

RFFE circuitry 208 may include a receive signal path, which may include circuitry configured to operate on RF beams received from one or more antennas 210. The RF beams may be transmit beams formed and transmitted by the AN 110 while operating in mmWave or sub-mmWave frequency rang. The RFFE circuitry 208 coupled with the one or more antennas 210 may receive the transmit beams and proceed them to the RF circuitry 206 for further processing. RFFE circuitry 208 may also include a transmit signal path, which may include circuitry configured to amplify signals for transmission provided by the RF circuitry 206 for transmission by one or more of the antennas 210, with or without beamforming. In various embodiments, the amplification through transmit or receive signal paths may be done solely in the RF circuitry 206, solely in the RFFE circuitry 208, or in both the RF circuitry 206 and the RFFE circuitry 208.

In some embodiments, the RFFE circuitry 208 may include a TX/RX switch to switch between transmit mode and receive mode operation. The RFFE circuitry 208 may include a receive signal path and a transmit signal path. The receive signal path of the RFFE circuitry 208 may include a low noise amplifier (LNA) to amplify received RF beams and provide the amplified received RF signals as an output (for example, to the RF circuitry 206). The transmit signal path of the RFFE circuitry 208 may include a power amplifier (PA) to amplify input RF signals (for example, provided by RF circuitry 206), and one or more filters to generate RF signals for beamforming and subsequent transmission (for example, by one or more of the one or more antennas 210).

Processors of the application circuitry 202 and processors of the baseband circuitry 204 may be used to execute elements of one or more instances of a protocol stack. For example, processors of the baseband circuitry 204, alone or in combination, may be used to execute Layer 3, Layer 2, or Layer 1 functionality, while processors of the application circuitry 202 may utilize data (for example, packet data) received from these layers and further execute Layer 4 functionality (for example, transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/AN, described in further detail below.

Figure 3B:
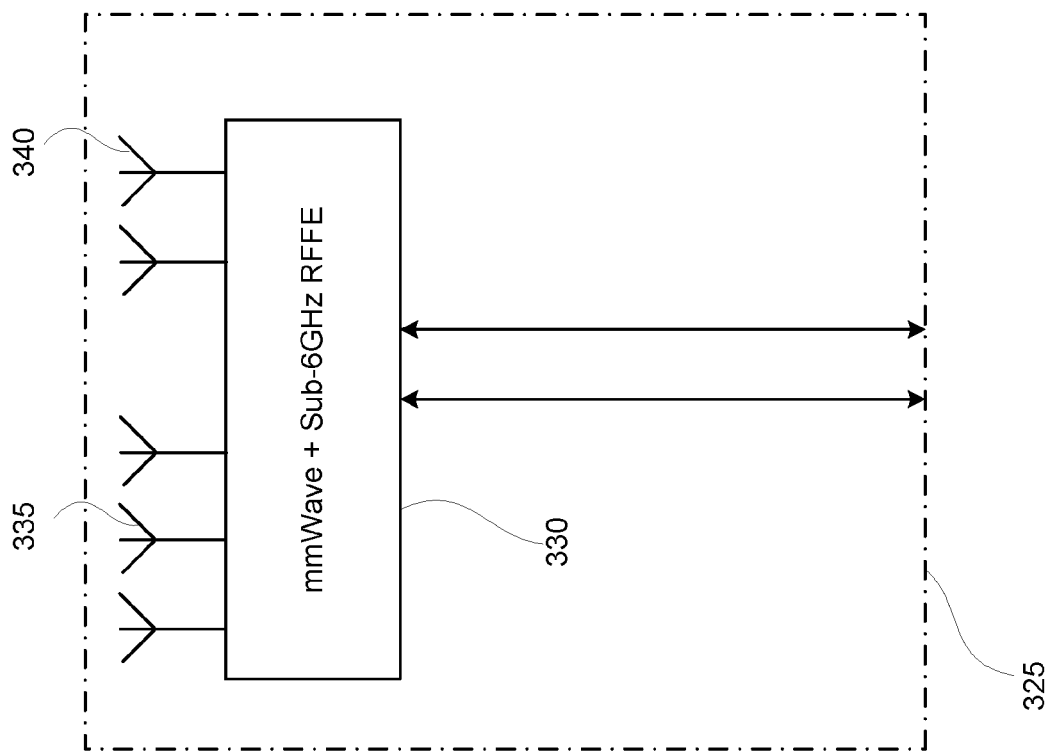
FIG. 3B illustrates an alternative RFFE in accordance with various embodiments.
Figure 3A:
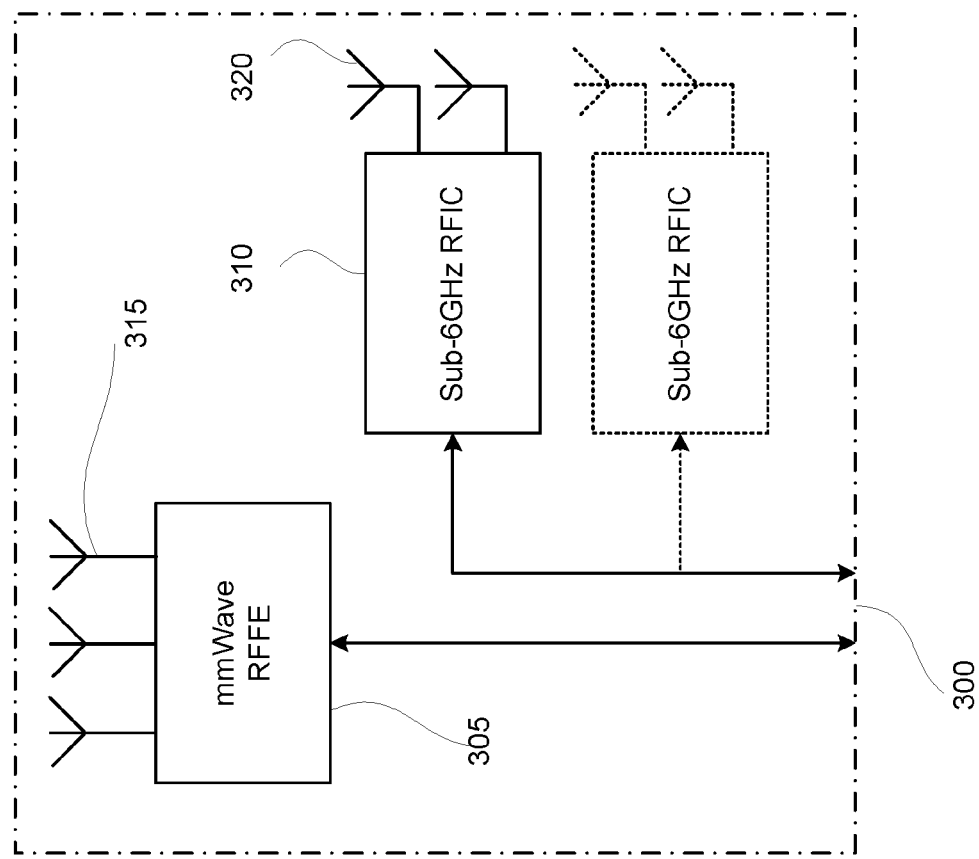
FIG. 3A illustrates an example radio frequency front end (RFFE) incorporating a millimeter Wave (mmWave) RFFE and one or more sub-millimeter wave radio frequency integrated circuits (RFICs) in accordance with some embodiments.

FIG. 3A illustrates an embodiment of a radio frequency front end 300 incorporating an mmWave RFFE 305 and one or more sub-6 GHz radio frequency integrated circuits (RFICs) 310. The mmWave RFFE 305 may be similar to and substantially interchangeable with the RFFE 165, RFFE 170, and/or the RFFE circuitry 208 in some embodiments. The mmWave RFFE 305 may be used for the UE 105 while operating in FR2 or mmWave; the RFICs 310 may be used for the UE 105 while operating in FR1, sub-6 GHz, or LTE bands. In this embodiment, the one or more RFICs 310 may be physically separated from the mmWave RFFE 305. RFICs 310 may include connection to one or more antennas 320. The RFFE 305 may be coupled with multiple antennas 315, which may constitute one or more antenna panels.

FIG. 3B illustrates an alternate embodiment of an RFFE 325. In this aspect both millimeter wave and sub-6 GHz radio functions may be implemented in the same physical RFFE 330. The RFFE 330 may incorporate both millimeter wave antennas 335 and sub-6 GHz antennas 340. The RFFE 330 may be similar to and substantially interchangeable with the RFFE 165, RFFE 170, and/or the RFFE circuitry 208 in some embodiments.

FIGS. 3A and 3B illustrate embodiments of various RFFE architectures for either the UE 105 or the AN 110.

Figure 4:
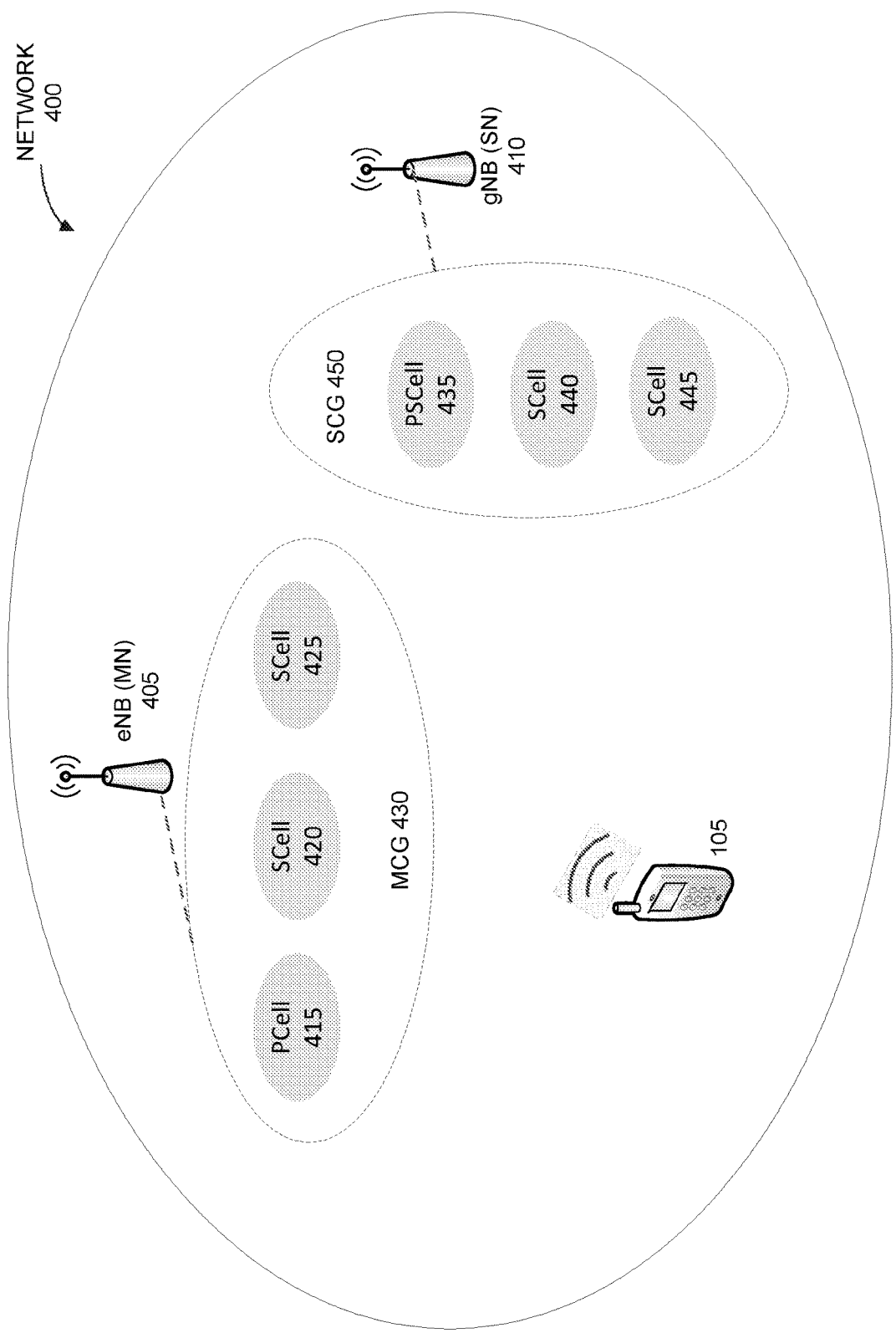
FIG. 4 illustrates an example network that involves 5G NR communications, in accordance with various embodiments.

FIG. 4 illustrates an example network 400 that involves 5G NR communications, according to various embodiments. The network 400 may be an EN-DC network. The network 400 may include multiple ANs and/or NodeBs, for example, eNB 405 and gNB 410. The eNB 405 and gNB 410 may be the same or substantially similar to the AN 110 in FIG. 1. The eNB 405 may be referred to as an MN 405 and the gNB 410 may be referred to as an SN 410. The eNB 405 may provide or be associated with a Primary Serving Cell (PCell) 415 of the UE 105. The eNB 405 may further provide or be associated with one or more Secondary Cells (SCells), for example, 420 and 425. The PCell 415 and SCells 420/425 may be part of a Master Cell Group (MCG) 430 of the UE 105.

In some embodiments, the gNB 410 may provide or be associated with a Primary Secondary Serving Cell (PSCell) 435 of the UE 105. The gNB 410 may further provide one or more SCells, e.g., 440 and 445. The PSCell 435 and SCells 440/445 may be part of an SCG 450 of the UE 105. Note that "AN of the PCell," "AN in the PCell," and "PCell" are used interchangeably throughout the disclosure herein, as well as regarding the terms of PSCell, SCell, etc.

In addition to the EN-DC mode, various embodiments discussed herein apply to an NR-DC mode, and other DC operating modes that involve an NR operation in the SCG 450. To simply descriptions herein, only EN-DC mode has been described as an example.

In a network that operates in an EN-DC mode with the UE 105, the UE 105 may receive LTE signals, also known as E-UTRA (Evolved Universal Terrestrial Radio Access) signals, from the eNB 405. The LTE signals may include a plurality of LTE frames, which further include a plurality of LTE subframes. Those LTE subframes may be referred to as MCG serving cell(s) subframes, or LTE subframes of MCG serving cell(s). The cells 415/420/425 may be referred to as LTE serving cells. Meanwhile, the UE 105 may receive NR signals from the gNB 410. The NR signals may include a plurality of NR frames, which may further include a plurality of NR subframes. Those NR subframes may be referred to as SCG serving cell(s) subframes, or NR subframes of SCG severing cell(s). The cells 435/440/445 may be referred to as NR serving cells. In addition, an NR subframe may include a plurality of NR slots. In some embodiments, the NR slots may be used in indicating the MG start. Note that an NR subframe may always be 1 millisecond (ms), and an NR slot may be 1 ms or have different lengths in a time domain due to various subcarrier spacings (SCSs).

Besides MCG/SCG serving cells, there may also be a plurality of neighbor cells in the network 400. Those neighbor cells associated with the eNB 405 may be referred to as MCG non-serving cells, and the neighbor cells associated with the gNB 410 may be referred to as SCG non-serving cells. The UE 105 may monitor one or more non-serving cells by performing reference signal measurements. The reference signal may operate at a serving frequency or a non-serving frequency. The serving frequency is a frequency at which one or more serving cells operate. The non-serving frequency is a frequency other than all serving frequencies at a moment.

The UE 105 may measure one or more reference signals associated with one or more cells of the SCG 450 based on configurations from the network. The configuration may be from the MN 405 or SN 410. The configuration may indicate one or more measurement objects (MOs) that include information of reference signal frequencies, SCSs and other information. The reference signal may include, but is not limited to, synchronization signal (SS) blocks, channel status information-reference signal (CSI-RS). If one or more of reference signal measurements associated with the SCG 450 fails or is considered to be failed based on certain measurement criteria, the SCG 450 may be determined to be a failure or a failure SCG. If the UE 105 determines an SCG failure based on corresponding criteria, the UE 105 may generate an SCG failure report to the MN 405 to report details regarding the SCG failure corresponding to the reference signal measurement. The criteria may include, but are not limited to, a radio link failure (RLF) on PSCell and PSCell change failure. Such a report may include a MeasResultSCG-Failure information element (IE) as an example. The MeasResultSCG-Failure IE may include information as listed below. Note that the MeasResultSCG-Failure IE does not provide SCS information regarding the failed reference signal.

| MeasResultSCG-Failure information element |
|---|
| -- ASN1START |
| -- TAG-MEAS-RESULT-SCG-FAILURE-START |
| MeasResultSCG-Failure ::=    SEQUENCE { |
|     measResultPerMOList       MeasResultList2NR, |
|     ... |
| } |
| MeasResultList2NR ::=    SEQUENCE (SIZE (1 ... maxFreq)) OF MeasResult2NR |
| MeasResult2NR ::=    SEQUENCE { |
|     ssbFrequency              ARFCN-ValueNR       OPTIONAL, |
|     refFreqCSI-RS             ARFCN-ValueNR       OPTIONAL, |
|     measResultServingCell     MeasResultNR        OPTIONAL, |
|     measResultNeighCellListNR MeasResultListNR    OPTIONAL |
| } |
| -- TAG-MEAS-RESULT-SCG-FAILURE-STOP |
| -- ASN1STOP |

In NR communications, NR numerologies allow multiple SCSs, such as 15 kHz, 30 kHz, 120 kHz, 240 kHz, etc. Thus, for any given reference signal frequency, one of the multiple SCSs may be used together with the reference signal frequency to characterize the reference signal. Thus, if the UE 105 does not include the SCS information of the failed or detected reference signal measurement in the SCG failure report, the MN 405 and/or SN 410 may not have a way of acknowledging the exact failed or detected reference signal measurement associated with the particular SCS. This may cause ambiguity to the MN 405/SN 410 and the MN 405/SN 410 may not be able to schedule or configure corresponding data communications within the network or configure the UE 105 with adequate cell and/or beam based on the SCG failure report. The SCG failure report may be insufficient to serve its purposes.

In one example, a UE 105 may be configured with more than one MO for an SSB frequency and each of those configured MOs may have the same reference signal frequency but different SCSs, which may be used in measuring neighbor cell(s). An example configuration is listed as below:

| MeasObjectNR ::=    SEQUENCE { | | |
|---|---|---|
|     ssbFrequency           ARFCNValueNR       | OPTIONAL, -- Cond SSBorAssociatedSSB | |
|     ssbSubcarrierSpacing   SubcarrierSpacing  | OPTIONAL, -- Cond SSBorAssociatedSSB | |
| <OMMITTED> | | |
| } | | |

In this example, the MN 405 may not be able to determine the SCS of the failed or detected SSB, if the failure report does not include information that can indicate the SCS of the failed or detected SS. Similarly, in CSI-RS measurements, the UE 105 may be configured with more than one MO and each of those configured MOs may have the same reference frequency but different CSI-RS resources, which may have the same or different SCSs. An example configuration is listed as below:

```
MeasObjectNR ::=              SEQUENCE {
  ssbFrequency                ARFCNValueNR              OPTIONAL, -- Cond
SSBorAssociatedSSB
  ssbSubcarrierSpacing        SubcarrierSpacing         OPTIONAL, -- Cond
SSBorAssociatedSSB
  smtc1                       SSB-MTC                   OPTIONAL, -- Cond
SSBorAssociatedSSB
  smtc2                       SSB-MTC2                  OPTIONAL, -- Cond
IntraFreqConnected
  refFreqCSI-RS               ARFCN-ValueNR             OPTIONAL,
  referenceSignalConfig       ReferenceSignalConfig,
<OMMITTED>
}
ReferenceSignalConfig::=      SEQUENCE {
  ssb-ConfigMobility          SSB-ConfigMobility        OPTIONAL, -- Need M
  csi-rs-ResourceConfigMobility   SetupRelease { CSI-RS-
ResourceConfigMobility }
  OPTIONAL -- Need M
}
<OMMITTED>
CSI-RS-ResourceConfigMobility ::=   SEQUENCE {
  subcarrierSpacing           SubcarrierSpacing,
  csi-RS-CeilList-Mobility    SEQUENCE (SIZE (1 ... maxNrofCSI-RS-CellsRRM)) OF
CSI-RS-CellMobility,
  ...
  [[
  refServCellIndex-v15xy      ServCellIndex             OPTIONAL -- Need
S
  ]]
}
```

In scenarios of measuring SS blocks (SSBs), the SSB frequency and PCI information may be sufficient to indicate the failed SS. The UE 105 may measure SSB according to the one or more MOs, and determine one (or more) SSB with a particular frequency and SCS failed the measurement. In a corresponding SCG failure report, the UE 105 may report the SSB frequency and the physical cell ID (PCI) that is associated with the SSB to the MN 405, the MN 405 may still be able to determine the exact SSB due to lack of corresponding SCS information. Under some network scenarios with a serving cell and/or a neighbor cell operating at a serving frequency, the UE may be configured to measure one or more SSBs in one or more bandwidth parts (BWP). Since the SSB frequencies may be different from one BWP to another, the SCG failure report may be sufficient to provide failed or detected reference signal information and/or measurement without ambiguity for the MN 405/SN 410. For neighbor cells at the serving frequency, corresponding PCI information may sufficiently indicate the failed or detected reference signal measurement.

In scenarios of measuring CSI-RS, a CSI-RS frequency, corresponding PCI, and a CSI-RS index may be included in the SCG reporting. If the cell is a serving cell, the UE 105 may be configured to measure for the same CSI-RS frequency and PCI, but with different SCS(s). For example, the UE 105 may measure at different BWPs in the same cell. If a cell measurement for the different SCSs of the same PCI and CSI-RS frequency are to be reported, it may cause ambiguity of which one SCS the reference signal measurement in the SCG failure reporting is referring to without the SCS being reported for a measurement. A similar situation may occur to the neighbor cell measurement in both serving and non-serving frequencies.

Note that the CSI-RS index may be optional and its use may depend on a configuration for reporting. For example, in a beam measurement, the CSI-RS index of the CSI-RS resource may be used to indicate a particular beam among all the beams related to the same CSI-RS frequency and PCI. But the CSI-RS index may not be available as it depends on the configuration for reporting. For example, the CSI-RS index may not be available if the reporting is based on cell level measurements.

In embodiments, the SCS information may be included in the SCG failure report so that the MN 405 and/or SN 410 may be able to identify the failed and/or other detected reference signals. An example reporting in the MeasResult-SCG-Failure IE is listed below. The SCS information is bolded in this example.

MeasResultSCG-Failure information element

```
-- ASN1START
-- TAG-MEAS-RESULT-SCG-FAILURE-START
MeasResultSCG-Failure ::=    SEQUENCE {
  measResultPerMOList        MeasResultList2NR,
  ...
}
MeasResultList2NR ::=        SEQUENCE (SIZE (1 ... maxFreq)) OF
                             MeasResult2NR
```

| MeasResultSCG-Failure information element |
| --- |
| MeasResult2NR ::=　　　　　SEQUENCE {<br>　　ssbFrequency　　　　　ARFCN-ValueNR　　　　　OPTIONAL,<br>　　refFreqCSI-RS　　　　　ARFCN-ValueNR<br>　　OPTIONAL,<br>　　subcarrierSpacing　　　SubcarrierSpacing,　　　OPTIONAL,<br>　　measResultServingCell　MeasResultNR　　　　　　OPTIONAL,<br>　　measResultNeighCellListNR　MeasResultListNR<br>　　OPTIONAL<br>}<br>-- TAG-MEAS-RESULT-SCG-FAILURE-STOP<br>-- ASN1STOP |

In embodiments, a measurement identification (ID) may be used alternatively or additionally. Since a measurement ID may include or indicate, among other things, the SCS information of the reference signal. The MN and/or SN 410 may be able to determine the SCS of the reference signal if the measurement ID is included in the SCG failure report. For example, if the SN 410 configures the measurement ID, it may be able to know the measurement information (e.g., frequency and SCS) that is being reported. Further, the MN 405 may know the measurement if the measurement ID allocation is coordinated between the MN 405 and SN 410. An example reporting in the MeasResultSCG-Failure IE is listed below. The measurement ID information (measId) is bolded in this example.

| MeasResultSCG-Failure information element |
| --- |
| -- ASN1START<br>-- TAG-MEAS-RESULT-SCG-FAILURE-START<br>MeasResultSCG-Failure ::=　　　SEQUENCE {<br>　　measResultPerMOList　　　MeasResultList2NR,<br>　　...<br>}<br>MeasResultList2NR ::=　　　　SEQUENCE (SIZE (1 ... maxFreq)) OF<br>　　　　　　　　　　　　　　　MeasResult2NR<br>MeasResult2NR ::=　　　　　　SEQUENCE {<br>　　ssbFrequency　　　　　　ARFCN-ValueNR　　　　OPTIONAL,<br>　　refFreqCSI-RS　　　　　　ARFCN-ValueNR<br>　　OPTIONAL,<br>　　measId　　　　　　　　MeasId,　　　　　　　　OPTIONAL,<br>　　measResultServingCell　　MeasResultNR　　　　　OPTIONAL,<br>　　measResultNeighCellListNR　MeasResultListNR<br>　　OPTIONAL<br>}<br>-- TAG-MEAS-RESULT-SCG-FAILURE-STOP<br>-- ASN1STOP |

In embodiments, the MN 405 and/or 410 may not be able to decode the SCS information and/or the measurement ID without an indication that indicates such information is included in the IE. An indication for this non-critical extension may be used in the MeasResultSCG-Failure IE or in a separate IE to indicate such information is included in the SCG failure report. This configurable parameter may provide backward compatibility for previous releases. An example indication in the MeasResultSCG-Failure IE is listed below. The non-critical extension (measResultPerMO-ListExt) is bolded in this example.

| MeasResultSCG-Failure information element |
| --- |
| -- ASN1START<br>-- TAG-MEAS-RESULT-SCG-FAILURE-START<br>MeasResultSCG-Failure ::=　　　SEQUENCE {<br>　　measResultPerMOList　　　MeasResultList2NR,<br>　　...,<br>　　[[<br>　　measResultPerMOListExt　　MeasResultList2NRExt,<br>　　]]<br>} |

| MeasResultSCG-Failure information element | | |
|---|---|---|
| MeasResultList2NR ::= | SEQUENCE (SIZE (1 ... maxFreq)) OF MeasResult2NR | |
| MeasResult2NR ::= | SEQUENCE { | |
| ssbFrequency | ARFCN-ValueNR | OPTIONAL, |
| refFreqCSI-RS | ARFCN-ValueNR | |
| OPTIONAL, | | |
| subcarrierSpacing | SubcarrierSpacing, | OPTIONAL, |
| measId | MeasId, | OPTIONAL, |
| measResultServingCell | MeasResultNR | OPTIONAL, |
| measResultNeighCellListNR | MeasResultListNR | |
| OPTIONAL | | |
| } | | |
| -- TAG-MEAS-RESULT-SCG-FAILURE-STOP | | |
| -- ASN1STOP | | |

In embodiments, the network including the MN 405 and/or SN 410 may configure the reference signal measurements so that the address ambiguity may not occur. This may require further coordination between the MN 405 and SN 410 and other control of the network.

Figures 5A, 5B:
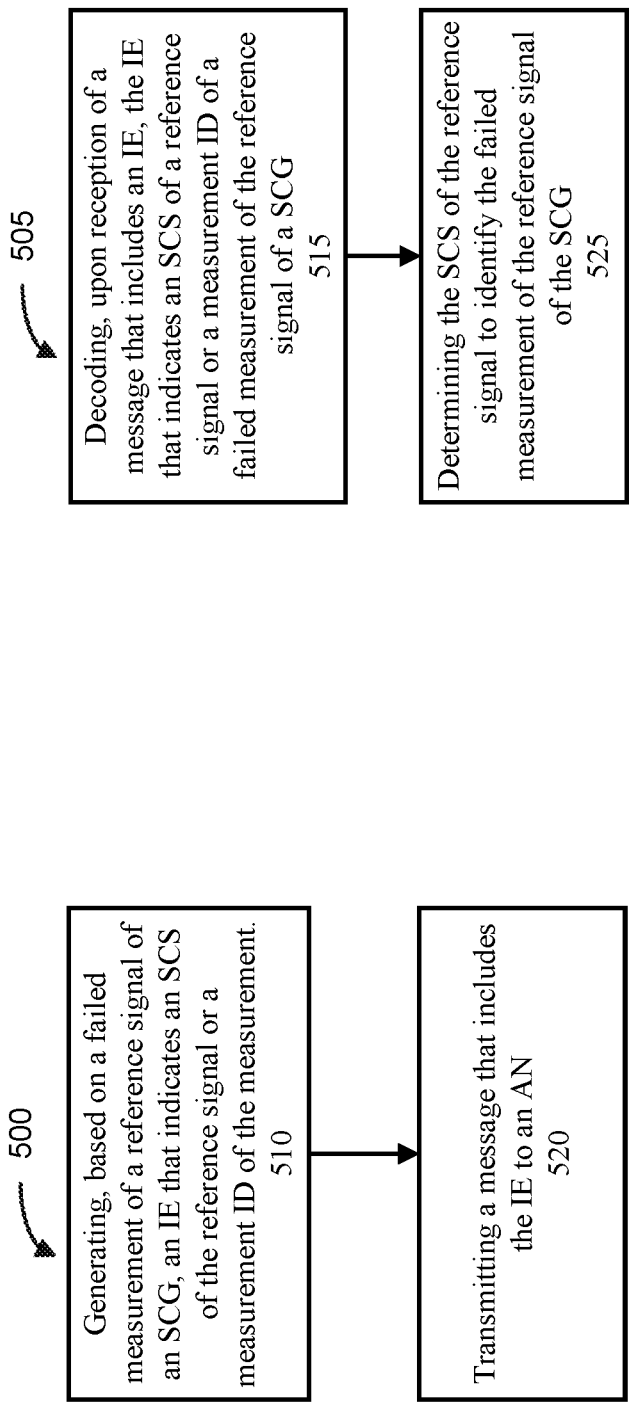
FIG. 5A illustrates an operation flow/algorithmic structure to facilitate a process of reporting a secondary cell group (SCG) failure with respect to an reference signal measurement by a UE in NR involved networks, in accordance with various embodiments.
FIG. 5B illustrates an operation flow/algorithmic structure to facilitate the process of reporting an SCG failure with respect to an reference signal measurement by the AN 110 in NR involved networks, in accordance with various embodiments.

FIG. 5A illustrates an operation flow/algorithmic structure 500 to facilitate a process of reporting an SCG failure with respect to a reference signal measurement by the UE 105 in NR involved networks, in accordance with various embodiments. Note that FIG. 5A describes a SCG failure reporting that is the same or substantially similar to the various embodiments described for the SCG failure reporting with respect to the FIG. 4. The operation flow/algorithmic structure 500 may be performed by the UE 105 or circuitry thereof.

The operation flow/algorithmic structure 500 may include, at 510, generating, based on a failed measurement of a reference signal of an SCG, an IE that indicates an SCS of the reference signal or a measurement ID of the measurement. This IE may be the same as or substantially similar to the MeasResultSCG-Failure IE as described above. The MeasResultSCG-Failure IE is also described in 3GPP technical specification (TS) 38.331, v15.2.1 (Jun. 21, 2018). The reference signal may be an SSB, a CSI-RS, or other like reference signals. Further details regarding the IE can be found in descriptions with respect to FIG. 4.

The operation flow/algorithmic structure 500 may further include, at 520, transmitting a message that includes the IE to an AN. The AN may be the same as or substantially similar to the AN 110 in this disclosure. The transmission of the message may be via RRC or other fit signaling.

In some embodiments, the IE may further include a bit information to indicate that the IE includes information of the SCS of the reference signal or the measurement ID of the measurement. Such a bit parameter may be a non-critical extension and expressed as a measResultPerMOListExt in the MeasResultSCG-Failure IE. Additionally or alternatively, this parameter may be indicated elsewhere in the same or a different format and transmitted to the AN.

In embodiments, the UE may receive measurement configuration(s) from the AN to perform reference signal measurement with respect to an SCG according to corresponding MOs. Once the UE measures the reference signal(s), it may determine one or more reference signals fail the measurement based on various criteria. The UE may generate a SCG failure report accordingly.

FIG. 5B illustrates an operation flow/algorithmic structure 505 to facilitate the process of reporting an SCG failure with respect to an reference signal measurement by the AN 110 in NR involved networks, in accordance with various embodiments. The operation flow/algorithmic structure 505 may be performed by the AN 110 or circuitry thereof.

The operation flow/algorithmic structure 505 may include, at 515, decoding, upon reception of a message that includes an IE generated by a UE, the IE that indicates an SCS of a reference signal or a measurement ID of a measurement of the reference signal of an SCG. The failed measurement may be determined based on the measurement of the reference signal.

The operation flow/algorithmic structure 505 may further include, at 525, determining the SCS of the reference signal to identify the failed measurement of the reference signal of the SCG. Once the failure SCG is identified with sufficient reference signal information, the AN may determine one or more actions with respect to the SCG. Those actions may include, but are not limited to, releasing the SCG, maintain the SCG, changing PSCell of the SCG, and changing other cell(s) of the SCG.

In some embodiments, the AN 110 may first decode an indication that indicates the received SCG failure report including additional information, such as the SCS of the reference signal, the measurement ID, or other information.

FIG. 6 illustrates example interfaces of baseband circuitry in accordance with some embodiments. As discussed above, the baseband circuitry 204 of FIG. 2 may comprise processors 204A-204E and a memory 204G utilized by said processors. The processors 204A-204E of the UE 105 may perform some or all of the operation flow/algorithmic structure 500, in accordance with various embodiments with respect to FIGS. 5A and 5B. The processors 204A-204E of the AN 110 may perform some or all of the operation flow/algorithmic structure 505, in accordance with various embodiments with respect to FIGS. 5A and 5B. Each of the processors 204A-204E may include a memory interface, 604A-604E, respectively, to send/receive data to/from the memory 204G. The processors 204A-204E of the UE 105 may be used to process the SFTD measurement; the processors 204A-204E of the AN 110 may be used to generate the SFTD measurement configuration.

The baseband circuitry 204 may further include one or more interfaces to communicatively couple to other circuitries/devices, such as a memory interface 612 (e.g., an interface to send/receive data to/from memory external to the baseband circuitry 204), an application circuitry interface 614 (for example, an interface to send/receive data to/from the application circuitry 202 of FIG. 2), an RF circuitry interface 616 (for example, an interface to send/receive data to/from RF circuitry 206 of FIG. 2), a wireless hardware connectivity interface 618 (for example, an interface to send/receive data to/from Near Field Communication (NFC) components, Bluetooth® components (for example, Bluetooth® Low Energy), Wi-Fi® components, and other communication components), and a power management interface 620 (for example, an interface to send/receive power or control signals).

Figure 7:
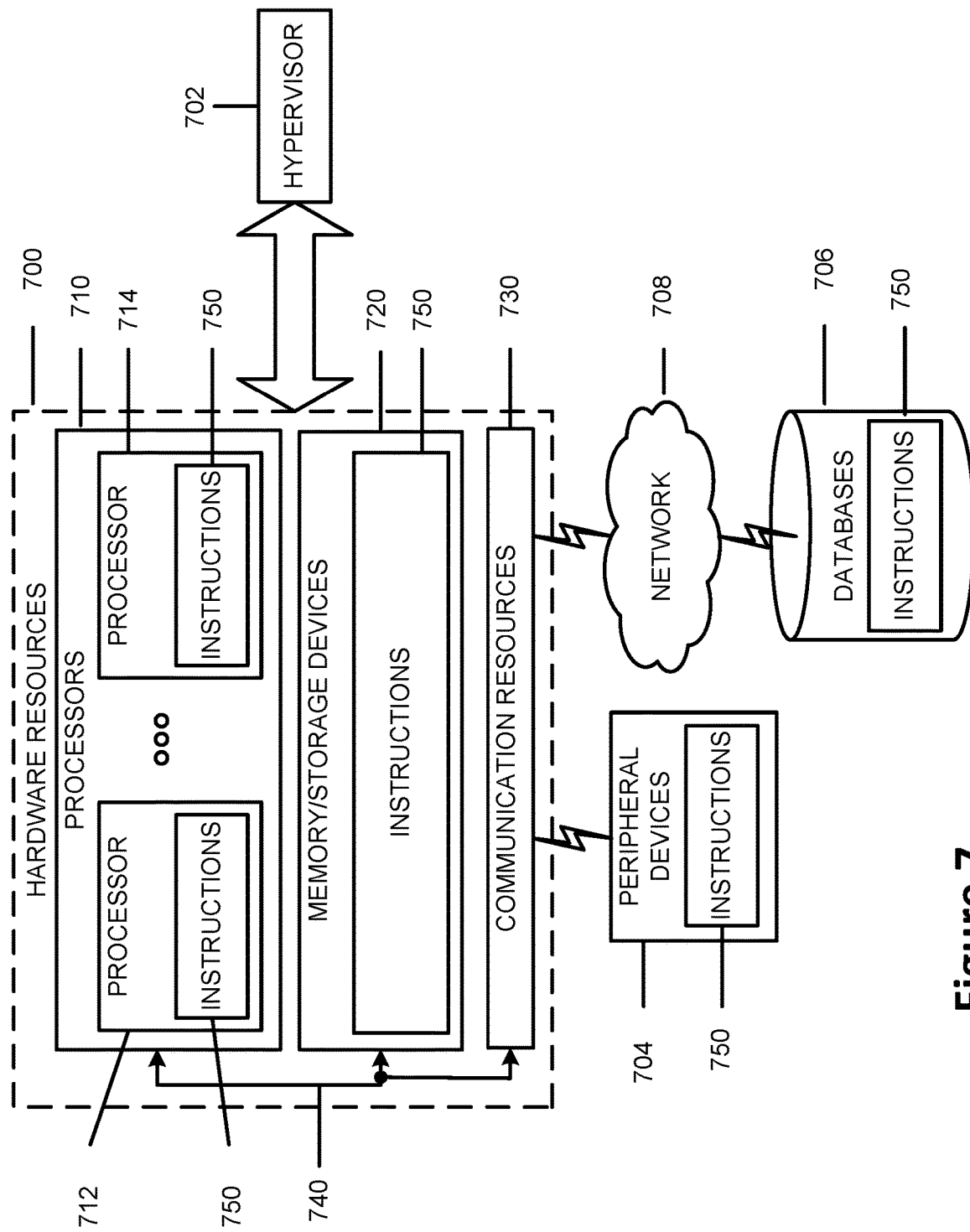
FIG. 7 illustrates hardware resources in accordance with some embodiments.

FIG. 7 is a block diagram illustrating components, according to some example embodiments, able to read instructions from a machine-readable or computer-readable medium (for example, a non-transitory machine-readable storage medium) and perform any one or more of the methodologies discussed herein. Specifically, FIG. 8 shows a diagrammatic representation of hardware resources 700 including one or more processors (or processor cores) 710, one or more memory/storage devices 720, and one or more communication resources 730, each of which may be communicatively coupled via a bus 840. For embodiments where node virtualization (for example, network function virtualization (NFV)) is utilized, a hypervisor 702 may be executed to provide an execution environment for one or more network slices/sub-slices to utilize the hardware resources 700.

The processors 710 (for example, a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 712 and a processor 714.

The memory/storage devices 720 may include main memory, disk storage, or any suitable combination thereof. The memory/storage devices 720 may include, but are not limited to, any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 730 may include interconnection or network interface components or other suitable devices to communicate with one or more peripheral devices 704 or one or more databases 706 via a network 708. For example, the communication resources 730 may include wired communication components (for example, for coupling via a Universal Serial Bus (USB)), cellular communication components, NFC components, Bluetooth® components (for example, Bluetooth® Low Energy), Wi-Fi® components, and other communication components.

Instructions 750 may comprise software, a program, an application, an applet, an app, or other executable code for causing at least any of the processors 710 to perform any one or more of the methodologies discussed herein, e.g., the operation flows 500 and 505. For example, in an embodiment in which the hardware resources 700 are implemented into the UE 105, the instructions 750 may cause the UE to perform some or all of the operation flow/algorithmic structure 500. In other embodiments, the hardware resources 700 may be implemented into the AN 110. The instructions 750 may cause the AN 110 to perform some or all of the operation flow/algorithmic structure 505. The instructions 750 may reside, completely or partially, within at least one of the processors 710 (for example, within the processor's cache memory), the memory/storage devices 720, or any suitable combination thereof. Furthermore, any portion of the instructions 750 may be transferred to the hardware resources 700 from any combination of the peripheral devices 704 or the databases 706. Accordingly, the memory of processors 710, the memory/storage devices 720, the peripheral devices 704, and the databases 706 are examples of computer-readable and machine-readable media.

Some non-limiting Examples of various embodiments are provided below.

Example 1 may include a method comprising: generating or causing to generate, based on an SCG failure corresponding to a measurement of a reference signal, an IE that indicates information with respect to the SCG failure; and transmitting or causing to transmit the message to an access node (AN).

Example 1.5 may include a method comprising: generating or causing to generate, based on a failed measurement of a reference signal, an IE that indicates information with respect to an SCG failure; and transmitting or causing to transmit the message to an access node (AN).

Example 2 may include the method of examples 1/1.5 and/or some other examples herein, wherein the IE is to indicate an SCS of the reference signal.

Example 3 may include the method of examples 1/1.5 and/or some other examples herein, wherein the IE is to indicate a measurement ID of the measurement.

Example 4 may include the method of example 3 and/or some other examples herein, wherein measurement ID is to indicate, among other things, a frequency of the reference signal and the SCS of the reference signal.

Example 5 may include the method of example 1 and/or some other examples herein, wherein the IE is to report the SCG failure.

Example 6 may include the method of examples 1-5 and/or some other examples herein, wherein the IE is a MeasResultSCG-Failure IE.

Example 7 may include the method of examples 1-6 and/or some other examples herein, wherein the reference signal includes a synchronization signal block (SSB) or a channel status information-reference signal (CSI-RS).

Example 8 may include the method of examples 1-7 and/or some other examples herein, wherein the IE includes a bit to indicate that the IE includes information of the SCS of the reference signal or the measurement ID of the measurement.

Example 9 may include the method of examples 1-7 and/or some other examples herein, wherein the IE is a first IE and, upon execution, the instructions are further to cause the UE to generate a second IE to indicate that the first IE includes information of the SCS of the reference signal or the measurement ID of the measurement.

Example 10 may include the method of examples 1-9 and/or some other examples herein, further comprising measuring or causing to measure the reference signal with respect to a cell of the SCG or a beam of the cell of the SCG; and determining or causing to determine that the SCG is a failure based on one or more measurement results from the measurement of the reference signal with respect to the cell of the SCG.

Example 11 may include the method of example 10 and/or some other examples herein, wherein the cell is a serving cell or a neighbor cell of the SCG.

Example 12 may include the method of example 10 and/or some other examples herein, wherein the reference signal is to operate at a serving frequency of a serving cell or a neighbor cell, or a non-serving frequency of the serving cell or the neighbor cell.

Example 13 may include the method of examples 1-12 and/or some other examples herein, wherein the AN is a master node (MN) in an EN-DC network, an NR-DC network, or a network with NR operations in the SCG.

Example 14 may include the method of examples 1-13 and/or some other examples herein, wherein the method is performed by the UE or a portion thereof.

Example 15 may include a method comprising: decoding or causing to decode, upon reception of a message that includes an IE generated by a UE, the IE that indicates information with respect to a failure SCG determined by the UE based on a measurement of a reference signal; and determining or causing to determine an SCS, among other things, of the reference signal to identify the failure SCG.

Example 16 may include the method of example 15 and/or some other examples herein, wherein the IE is to indicate an SCS of the reference signal.

Example 17 may include the method of example 15 and/or some other examples herein, wherein the IE is to indicate a measurement ID of the measurement.

Example 18 may include the method of example 15 and/or some other examples herein, wherein measurement ID is to indicate, among other things, a frequency of the reference signal and the SCS of the reference signal.

Example 19 may include the method of examples 15-18 and/or some other examples herein, wherein the IE is to report an SCG failure and is a MeasResultSCG-Failure IE.

Example 20 may include the method of examples 15-19 and/or some other examples herein, wherein the IE includes a bit to indicate that the IE includes information of the SCS of the reference signal or the measurement ID of the measurement.

Example 21 may include the method of examples 15-20 and/or some other examples herein, wherein the IE is a first IE and, upon execution, the instructions are further to cause the AN to decode a second IE to indicate that the first IE includes information of the SCS of the reference signal or the measurement ID of the measurement.

Example 22 may include the method of examples 15-20 and/or some other examples herein, further comprising releasing or causing to release the failure SCG based on decoding.

Example 23 may include the method of examples 15-20 and/or some other examples herein, further comprising changing or causing to change the failure SCG.

Example 24 may include the method of example 23 and/or some other examples herein, wherein to change the failure SCG is to change one or more operating frequencies and/or associated SCSs with respect to one or more cells of the failure SCG.

Example 25 may include the method of examples 15-24 and/or some other examples herein, wherein the AN is a master node (MN) in an EN-DC network, an NR-DC network, or a network with NR operations in the SCG.

Example 26 may include the method of examples 15-25 and/or some other examples herein, wherein the method is performed by the AN or a portion thereof.

Example 27 may include an apparatus comprising means to perform one or more elements of the method described in or related to any of examples 1-26, or any other method or process described herein.

Example 28 may include one or more non-transitory computer-readable media comprising instructions to cause an electronic device, upon execution of the instructions by one or more processors of the electronic device, to perform one or more elements of the method described in or related to any of examples 1-26, or any other method or process described herein.

Example 29 may include an apparatus comprising logic, modules, and/or circuitry to perform one or more elements of the method described in or related to any of examples 1-26, or any other method or process described herein.

Example 30 may include a method, technique, or process as described in or related to any of examples 1-26, or portions or parts thereof.

Example 31 may include an apparatus comprising: one or more processors and one or more computer-readable media comprising instructions that, when executed by the one or more processors, cause the one or more processors to perform the method, techniques, or process as described in or related to any of examples 1-26, or portions thereof.

The present disclosure is described with reference to flowchart illustrations or block diagrams of methods, apparatuses (systems) and computer program products according to embodiments of the disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means that implement the function/act specified in the flowchart or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide processes for implementing the functions/acts specified in the flowchart or block diagram block or blocks.

The description herein of illustrated implementations, including what is described in the Abstract, is not intended to be exhaustive or to limit the present disclosure to the precise forms disclosed. While specific implementations and examples are described herein for illustrative purposes, a variety of alternate or equivalent embodiments or implementations calculated to achieve the same purposes may be made in light of the above detailed description, without departing from the scope of the present disclosure, as those skilled in the relevant art will recognize.

What is claimed is:

1. A non-transitory computer-readable medium (CRM) comprising instructions to, upon execution of the instructions by one or more processors of a user equipment (UE), cause the UE to perform operations, the operations comprising:
generating, based on a failed measurement of a reference signal of a secondary cell group (SCG), an information element (IE) that indicates a subcarrier spacing (SCS) of the reference signal or a measurement identification (ID) of the failed measurement; and transmitting a message that includes the IE to an access node (AN),
wherein the IE includes a bit to indicate that the IE includes information of the SCS of the reference signal or the measurement ID of the failed measurement.

2. The non-transitory CRM of claim 1, wherein the IE is to report the failed measurement of the reference signal of the SCG and is a MeasResultSCG-Failure IE.

3. The non-transitory CRM of claim 1, wherein the reference signal includes a synchronization signal block (SSB) or a channel status information-reference signal (CSI-RS).

4. The non-transitory CRM of claim 1, wherein the IE is a first IE, and wherein the operations further comprise generating a second IE to indicate that the first IE includes the information of the SCS of the reference signal or the measurement ID of the failed measurement.

5. The non-transitory CRM of claim 1, wherein the operations further comprise:
measuring the reference signal with respect to a cell of the SCG, or a beam of the cell of the SCG; and
determining that the measuring is the failed measurement based on one or more measurement results from the measuring of the reference signal with respect to the cell of the SCG or the beam of the cell of the SCG.

6. The non-transitory CRM of claim 5, wherein the cell is a serving cell or a neighbor cell with respect to the SCG.

7. The non-transitory CRM of claim 5, wherein the reference signal is to operate at a serving frequency of a serving cell or a neighbor cell, or a non-serving frequency of the neighbor cell.

8. The non-transitory CRM of claim 7, wherein the serving frequency and the non-serving frequency are new radio (NR) frequencies.

9. The non-transitory CRM of claim 1, wherein the AN is a master node (MN) in an Evolved Universal Terrestrial Radio Access-new radio dual connectivity (EN-DC) network, or an new radio-dual connectivity (NR-DC) network.

10. A non-transitory computer-readable medium (CRM) comprising instructions to, upon execution of the instructions by one or more processors of an access node (AN), cause the AN to perform operations, the operations comprising:
decoding, upon reception of a message that includes an information element (IE) generated by a user equipment (UE), the IE that indicates a subcarrier spacing (SCS) of a reference signal or a measurement identification (ID) of a failed measurement of the reference signal of a secondary cell group (SCG); and
determining the SCS of the reference signal to identify the failed measurement of the reference signal of the SCG.

11. The non-transitory CRM of claim 10, wherein the IE is to report the failed measurement of the reference signal of the SCG and is a MeasResultSCG-Failure IE.

12. The non-transitory CRM of claim 10, wherein the IE includes a bit to indicate that the IE includes information of the SCS of the reference signal or the measurement ID of the failed measurement.

13. The non-transitory CRM of claim 10, wherein the IE is a first IE, and wherein the operations further comprise decoding a second IE to indicate that the first IE includes information of the SCS of the reference signal or the measurement ID of the failed measurement.

14. The non-transitory CRM of claim 10, wherein the operations further comprise releasing or changing the SCG based at least on the determined SCS of the reference signal.

15. The non-transitory CRM of claim 10, wherein the AN is a master node (MN) in an Evolved Universal Terrestrial Radio Access-new radio dual connectivity (EN-DC) network, or an new radio-dual connectivity (NR-DC) network.

16. A user equipment (UE), comprising:
processing circuitry, configured to:
generate, based on a measurement of a reference signal of a secondary cell group (SCG), an information element (IE) that indicates a SCG failure, wherein the IE is to indicate a subcarrier spacing (SCS) of the reference signal or a measurement identification (ID) of the measurement; and
interface circuitry coupled with the processing circuitry, the interface circuitry configured to transmit the IE to an access node (AN) to report the SCG failure,
wherein the IE includes a bit to indicate that the IE includes information of the SCS of the reference signal or the measurement ID of the measurement.

17. The non-transitory CRM of claim 10, wherein the operations further comprise:
generating a message to indicate determined the SCS of the reference signal; and
transmitting the message to a secondary node (SN) that operates with new radio (NR) communications.

18. The UE of claim 16, wherein the interface circuitry is further configured to measure the reference signal that corresponds to the SCS and a carrier frequency with respect to a cell of the SCG.

19. The UE of claim 18, wherein the processing circuitry is further configured to determine that the SCG is a failure based on one or more measurement results from the measurement of the reference signal.

* * * * *